US012010755B2

(12) United States Patent
Jang et al.

(10) Patent No.: US 12,010,755 B2
(45) Date of Patent: Jun. 11, 2024

(54) METHOD AND APPARATUS FOR PERFORMING COMMUNICATION IN WIRELESS COMMUNICATION SYSTEM

(71) Applicant: Samsung Electronics Co., Ltd., Suwon-si (KR)

(72) Inventors: Jaehyuk Jang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 17/430,992

(22) PCT Filed: Feb. 10, 2020

(86) PCT No.: PCT/KR2020/001819
§ 371 (c)(1),
(2) Date: Aug. 13, 2021

(87) PCT Pub. No.: WO2020/166905
PCT Pub. Date: Aug. 20, 2020

(65) Prior Publication Data
US 2022/0183101 A1 Jun. 9, 2022

(30) Foreign Application Priority Data
Feb. 13, 2019 (KR) .......... 10-2019-0016837

(51) Int. Cl.
*H04W 76/28* (2018.01)
*H04B 7/06* (2006.01)
(Continued)

(52) U.S. Cl.
CPC .......... *H04W 76/28* (2018.02); *H04B 7/0626* (2013.01); *H04W 24/10* (2013.01); *H04W 80/02* (2013.01)

(58) Field of Classification Search
None
See application file for complete search history.

(56) References Cited

U.S. PATENT DOCUMENTS

2015/0189690 A1* 7/2015 Lee ................ H04W 76/28
370/328
2016/0073344 A1 3/2016 Vutukuri et al.
(Continued)

FOREIGN PATENT DOCUMENTS

EP 2 621 242 A1 7/2013
EP 2 833 663 A1 2/2015
(Continued)

OTHER PUBLICATIONS

European Office Action dated May 3, 2023, issued in European Patent Application No. 20 756 588.8.
(Continued)

*Primary Examiner* — Christine T Duong
(74) *Attorney, Agent, or Firm* — Jefferson IP Law, LLP

(57) ABSTRACT

The present disclosure relates to a method and apparatus for performing communication in a wireless communication system. A user equipment (UE) may receive, from a base station, at least one of secondary cell (SCell) configuration information, channel state measurement configuration information, and timer configuration information used for discontinuous reception (DRX), measure a channel state based on the received configuration information, and transmit information about the measured channel state to the base station.

11 Claims, 10 Drawing Sheets

(51) Int. Cl.
*H04W 24/10* (2009.01)
*H04W 80/02* (2009.01)

(56) References Cited

U.S. PATENT DOCUMENTS

2020/0045768 A1* 2/2020 He .................... H04W 52/0229
2020/0067664 A1 2/2020 Kim et al.

FOREIGN PATENT DOCUMENTS

| EP | 3 641 155 A1 | 4/2020 |
| KR | 10-2013-0018188 A | 2/2013 |
| WO | 2014/112751 A1 | 7/2014 |
| WO | 2017/168396 A1 | 10/2017 |
| WO | 2018/230975 A1 | 12/2018 |

OTHER PUBLICATIONS

Ericsson, 'RRC configuration for CSI-MeasConfig', R2-1713738, 3GPP TSG-RAN WG2 Meeting #100 on NR, Reno, Nevada, Nov. 17, 2017, See sections 2, 5.2.1.3, 8.1.1.1.
Samsung, 'Semi-Persistent CSI Reporting and SRS for DRX', R2-1809842, 3GPP TSG-RAN WG2 NR AH 1807, Montreal, QC, Canada, Jun. 21, 2018, See sections 2-2.1.
3GPP; TSG RAN; NR; Physical layer procedures for data (Release 15), 3GPP TS 38.214 V15.4.0, Jan. 11, 2019, See sections 5.2.1.1-5.2.1.4, 5.2.4.
Extended European Search Report dated Mar. 17, 2022, issued in European Patent Application No. 20756588.8.

* cited by examiner

METHOD AND APPARATUS FOR PERFORMING COMMUNICATION IN WIRELESS COMMUNICATION SYSTEM

TECHNICAL FIELD

The present disclosure relates to a wireless communication system, and more particularly, to a method and apparatus for performing communication in a wireless communication system.

BACKGROUND ART

Improved 5th generation (5G) communication systems or pre-5G communication systems have been developed to meet the explosively growing demand for wireless data traffic due to the commercialization of 4th generation (4G) communication systems and the increase in multimedia services. For this reason, the 5G or pre-5G communication systems are referred to as beyond 4G network communication systems or post long-term evolution (LTE) systems.

Implementation of 5G communication systems in an ultra-high frequency (millimeter-wave (mmWave)) band (such as the 60-GHz band) is under consideration to achieve high data transfer rates. To mitigate the path loss of radio waves and increase the transmission distance of radio waves in an ultra-high frequency band for 5G communication systems, technologies such as beamforming, massive multiple-input multiple-output (massive MIMO), full dimensional MIMO (FD-MIMO), array antennas, analog beamforming, and large-scale antennas have been discussed.

Furthermore, for 5G communication systems, technologies such as evolved small cells, advanced small cells, cloud radio access network (cloud RAN), ultra-dense networks, device to device (D2D) communication, wireless backhaul, moving networks, cooperative communication, coordinated multi-points (COMP), interference cancellation, etc. have been developed to improve the system network performance. In addition, for 5G systems, advanced coding modulation (ACM) schemes such as Hybrid FSK and QAM Modulation (FQAM) and Sliding Window Superposition Coding (SWSC) and advanced access techniques such as Filter Bank Multicarrier (FBMC), non-orthogonal multiple access (NOMA), sparse code multiple access (SCMA), etc. have been developed.

Moreover, the Internet has evolved from a human-centered connection network, in which humans create and consume information, to the Internet of things (IoT) network in which dispersed components such as objects exchange information with one another to process the information. Internet of Everything (IoE) technology has also emerged, in which the IoT technology is combined with, for example, a technology for processing big data through connection with a cloud server. To implement the IoT, technical elements such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In an IoT environment, intelligent Internet technology services may be provided to create new values for human life by collecting and analyzing data obtained from interconnected objects. The IoT may be applied to various fields such as smart homes, smart buildings, smart cities, smart cars or connected cars, a smart grid, health care, smart home appliances, advanced medical services, etc., through convergence and integration between existing information technology (IT) and various industries.

Thus, various attempts have been made to apply a 5G communication system to an IoT network. For example, technologies such as sensor networks, M2M communication, MTC, etc., are implemented using 5G communication techniques such as beamforming, MIMO, array antennas, etc. The application of a cloud RAN as the above-described big data processing technology is an example of the convergence between the 5G and IoT technologies.

DESCRIPTION OF EMBODIMENTS

Technical Problem

An embodiment of the present disclosure relates to a method and apparatus for reporting a channel state when using a discontinuous reception (DRX) technology in a wireless communication system.

Solution to Problem

The present disclosure relates to a method and apparatus for performing communication in a wireless communication system. According to an embodiment of the present disclosure, a user equipment (UE) may receive, from a base station, at least one of secondary cell (SCell) configuration information, channel state measurement configuration information, and timer configuration information used for discontinuous reception (DRX), measure a channel state based on the received configuration information, and transmit information about the measured channel state to the base station.

Advantageous Effects of Disclosure

According to an embodiment of the present disclosure, a terminal may reduce its power consumption by dynamically adjusting a method of reporting a channel state according to the amount of data to be transmitted or received, etc.

BEST MODE

Figure 1A:
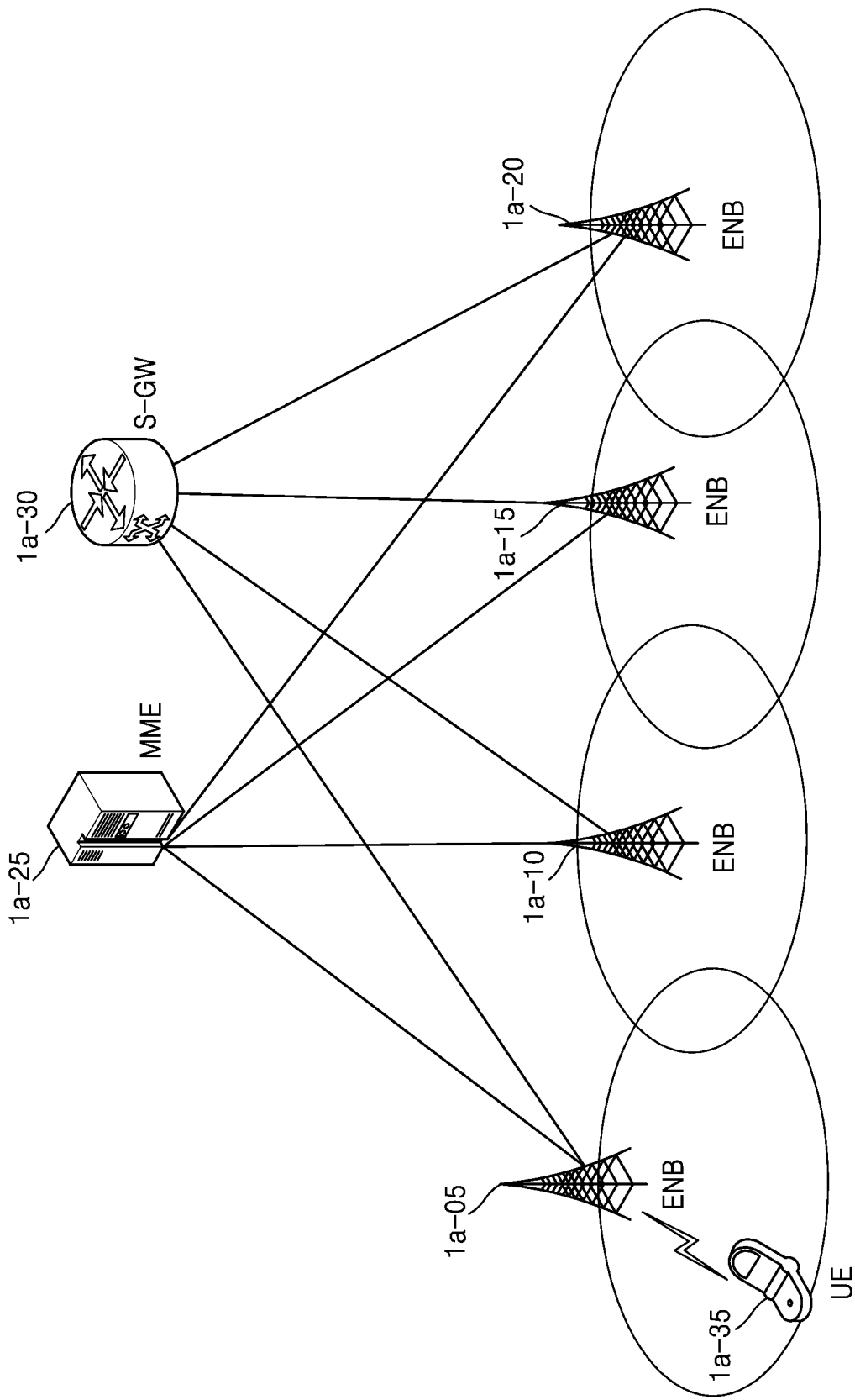
FIG. 1A is a diagram illustrating a structure of a long-term evolution (LTE) system referred to for description of the present disclosure.

According to an embodiment, a method of performing, by a user equipment (UE), communication in a wireless communication system includes: receiving, from a base station, at least one of secondary cell (SCell) configuration information, channel state measurement configuration information, and timer configuration information used for discontinuous reception (DRX); measuring a channel state based on the received configuration information; and transmitting information about the measured channel state to the base station.

According to an embodiment, a method of performing, by a UE, communication in a wireless communication system includes: receiving, from a base station, a control signal including configuration information for reporting channel state information (CSI); measuring a channel state in a bandwidth determined based on the received configuration information; and transmitting, to the base station, information about the measured channel state based on uplink (UL) resources and a reporting period determined according to the configuration information.

According to an embodiment, a method of performing, by a base station, communication in a wireless communication system includes: transmitting a control signal including configuration information for reporting CSI; and receiving CSI measured at a UE, based on UL resources and a reporting period determined according to the received configuration information.

According to an embodiment, a UE for performing communication in a wireless communication system includes: a transceiver; and at least one processor connected to the transceiver and configured to: control the transceiver to receive, from a base station, a control signal including configuration information for reporting CSI; measure a channel state in a bandwidth determined based on the received configuration information; and control the transceiver to transmit, to the base station, information about the measured channel state based on UL resources and a reporting period determined according to the configuration information.

According to an embodiment, a base station for performing communication in a wireless communication system includes: a transceiver; and at least one processor connected to the transceiver and configured to control the transceiver to transmit a control signal including configuration information for reporting CSI and receive CSI measured at a UE, based on a bandwidth, UL resources, and a reporting period determined according to the received configuration information.

According to an embodiment, a method of performing, by a UE, communication in a wireless communication system includes: receiving, from a base station, a control signal including DRX configuration information; determining a DRX mode identified according to at least one of a DRX timer length, a DRX period, and a DRX timer starting position based on the received configuration information; and running a DRX timer based on the determined DRX mode.

The method of performing, by the UE, communication in the wireless communication system may further include: receiving a MAC CE including information indicating that a DRX mode is changed; and changing the determined DRX mode based on DRX mode information contained in the MAC CE.

The method may further include, according to reception of the MAC CE, stopping a DRX timer that is already running; and starting a DRX timer corresponding to the changed DRX mode.

The method may further include transmitting, to the base station, a response message informing that the configuration information has been received.

According to an embodiment, a method of performing, by a base station, communication in a wireless communication system includes: obtaining information about a DRX mode identified according to at least one of a DRX timer length, a DRX period, and a DRX timer starting position; and transmitting a control signal including DRX configuration information including the information about the DRX mode, wherein a DRX timer runs in the UE based on the determined DRX mode.

The method of performing, by the base station, communication in the wireless communication system may further include transmitting a MAC CE including information indicating that a DRX mode is changed, wherein the determined DRX mode is changed based on DRX mode information contained in the MAC CE.

In the method of performing, by the base station, communication in the wireless communication system, as the MAC CE is received, a DRX timer that is already running may be stopped, and a DRX timer corresponding to the changed DRX mode may be started.

The method may further include receiving, from the UE, a response message informing that the configuration information has been received.

According to an embodiment, a UE for performing communication in a wireless communication system includes: a transceiver; and at least one processor configured to: control the transceiver to receive a control signal including DRX configuration information from a base station; determine a DRX mode identified according to at least one of a DRX timer length, a DRX period, and a DRX timer starting position based on the received configuration information; and run a DRX timer based on the determined DRX mode.

According to an embodiment, a base station for performing communication in a wireless communication system includes: a transceiver; and at least one processor configured to: obtain information about a DRX mode identified according to at least one of a DRX timer length, a DRX period, and a DRX timer starting position; and control the transceiver to transmit a control signal including DRX configuration information including the information about the DRX mode, wherein a DRX timer runs in the UE based on the determined DRX mode.

Mode of Disclosure

Hereinafter, operation principles of the present disclosure will be described in detail with reference to the accompanying drawings. In the following description of the present disclosure, when it is determined that detailed descriptions of related known functions or configurations may unnecessarily obscure the subject matter of the present disclosure, the descriptions thereof will be omitted. Furthermore, the terms to be described later are defined by taking functions described in the present disclosure into account and may be changed according to a user's or operator's intent or customs. Therefore, definition of the terms should be made based on the overall descriptions in the present specification.

As used in the following description, terms identifying access nodes, terms indicating network entities, terms indicating messages, terms indicating interfaces between network entities, terms indicating various types of identification information, etc. are exemplified for convenience of description. Accordingly, the present disclosure is not limited to terms to be described later, and other terms representing objects having the equivalent technical meaning may be used.

For example, in the following description, a terminal may refer to medium access control (MAC) entities in the terminal, which respectively exist for a master cell group (MCG) and a secondary cell group (SCG) as described below.

Hereinafter, for convenience of description, the present disclosure uses terms and names defined in the $3^{rd}$ Generation Partnership Project Long-Term Evolution (3GPP LTE) standard that is a latest standard among existing communication standards. However, the present disclosure is not limited to the terms and names but may also be identically applied to systems that comply with other standards. In particular, the present disclosure may be applied to the 3GPP New Radio (NR) (the $5^{th}$ generation (5G) mobile communications standard).

FIG. 1A is a diagram illustrating a structure of an LTE system referred to for description of the present disclosure.

Referring to FIG. 1A, a wireless communication system may consist of a plurality of base stations 1a-05, 1a-10, 1a-15, and 1a-20, a mobility management entity (MME) 1a-20, and a serving-gateway (S-GW) 1a-30. A user equipment (hereinafter, referred to as a UE or terminal) 1a-35 may connect to an external network via the base stations 1a-05, 1a-10, 1a-15, and 1a-20, and the S-GW 1a-30.

The base stations 1a-05, 1a-10, 1a-15, and 1a-20 are access nodes in a cellular network and may provide radio access to UEs accessing the cellular network. In other words, the base stations 1a-05, 1a-10, 1a-15, and 1a-20 may support connectivity between UEs and a core network (CN) by performing scheduling by collecting status information such as buffer states, available transmit power states, and channel states for the UEs in order to serve users' traffic. The MME 1a-25 is an apparatus responsible for performing various control functions as well as mobility management for a UE and is connected to multiple base stations, and the S-GW 1a-30 is an apparatus for providing a data bearer.

In addition, the MIME 1a-25 and the S-GW1a-30 may further perform authentication, bearer management, etc. for a UE accessing the network, and process packets arriving from the base stations 1a-05, 1a-10, 1a-15, and 1a-20 or packets to be delivered thereto.

Figure 1B:
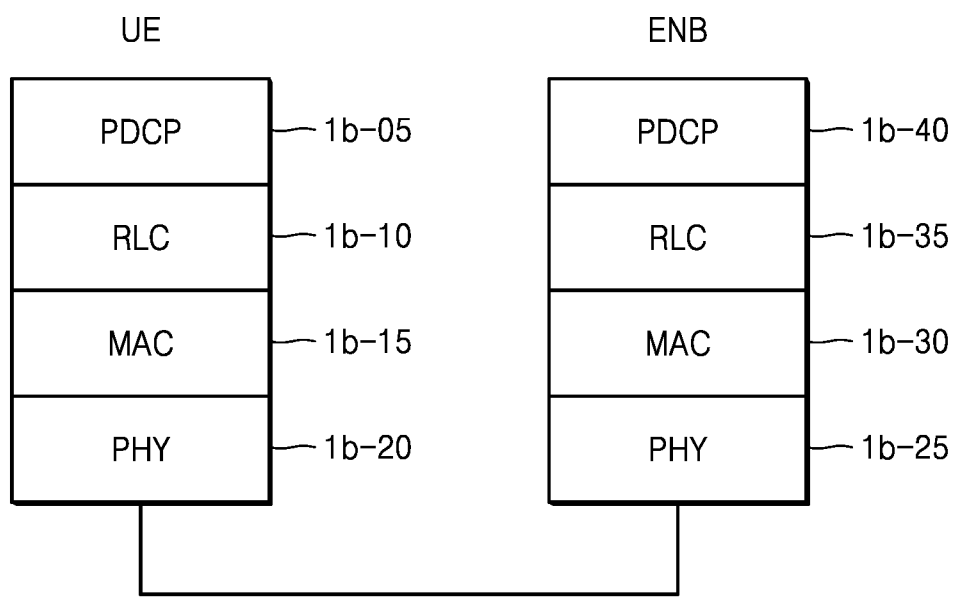
FIG. 1B is a diagram illustrating a radio protocol architecture for an LTE system, according to an embodiment of the present disclosure.

FIG. 1B illustrates a radio protocol architecture for an LTE system, according to an embodiment of the present disclosure.

Referring to FIG. 1B, a radio protocol stack for each of a UE and an eNB in the LTE system may include packet data convergence protocol (PDCP) 1b-05 or 1b-40, radio link control (RLC) 1b-10 or 1b-35, and medium access control (MAC) 1b-15 or 1b-30. The PDCP 1b-05 or 1b-40 may be responsible for performing compression/decompression of an IP header, etc.

The RLC 1b-10 or 1b-35 may reconfigure PDCP packet data units (PDUs) to appropriate sizes.

The MAC 1b-15 or 1b-30 may be connected with multiple RLC layer entities configured for a UE. The MAC 1b-15 or 1b-30 may multiplex RLC PDUs into MAC PDUs and demultiplex RLC PDUs from MAC PDUs.

A physical (PHY) layer 1b-20 or 1b-25 may perform channel coding and modulation on upper-layer data to generate orthogonal frequency division multiplexing (OFDM) symbols and transmit the OFDM symbols via a radio channel. Furthermore, the PHY layer 1b-20 or 1b-25 may also perform demodulation and channel decoding on OFDM symbols received via a radio channel and transfer the demodulated and channel-decoded OFDM symbols to an upper layer. Furthermore, hybrid automatic repeat request (HARQ) is used for additional error correction at the PHY layer 1b-20 or 1b-25, and a receiving end may transmit one bit of information indicating whether packets transmitted from a transmitting end are received. The information indicating whether packets transmitted from a transmitting end is received may be described as HARQ acknowledgement (ACK)/negative acknowledgement (NACK) information.

Downlink HARQ ACK/NACK information for uplink transmission may be transmitted via a physical HARQ indicator channel (PHICH), while uplink HARQ ACK/NACK information for downlink transmission may be transmitted via a physical uplink control channel (PUCCH) or a physical uplink shared channel (PUSCH). The PUCCH is generally transmitted in uplink of a primary cell (PCell) to be described later; however, when a UE supports PUCCH transmission of a secondary cell (SCell), a base station may additionally transmit the PUCCH to a UE from the SCell to be described later, which is called a PUCCH SCell.

Although not shown in FIG. 1B, a radio resource control (RRC) layer may exist on top of the PDCP layer at each of the UE and the base station. The UE and the base station may exchange, via RRC layers, configuration control messages related to connection and measurements with each other for controlling radio resources.

Moreover, the PHY layer 1b-20 or 1b-25 may consist of one or a plurality of frequencies/carriers. A technology for simultaneously configuring and using a plurality of frequencies may be described as carrier aggregation (hereinafter, referred to as CA). The CA technology may significantly increase the amount of data that can be transmitted in proportion to the number of secondary carriers by employing one or a plurality of secondary carriers in addition to a primary carrier instead of using only one primary carrier for communication between a UE and a base station (evolved universal terrestrial radio access network (E-UTRAN) NodeB or eNB). Moreover, in LTE, a cell in a BS using a primary carrier is termed a PCell, and a cell using a secondary carrier is termed a SCell.

Figure 1C:
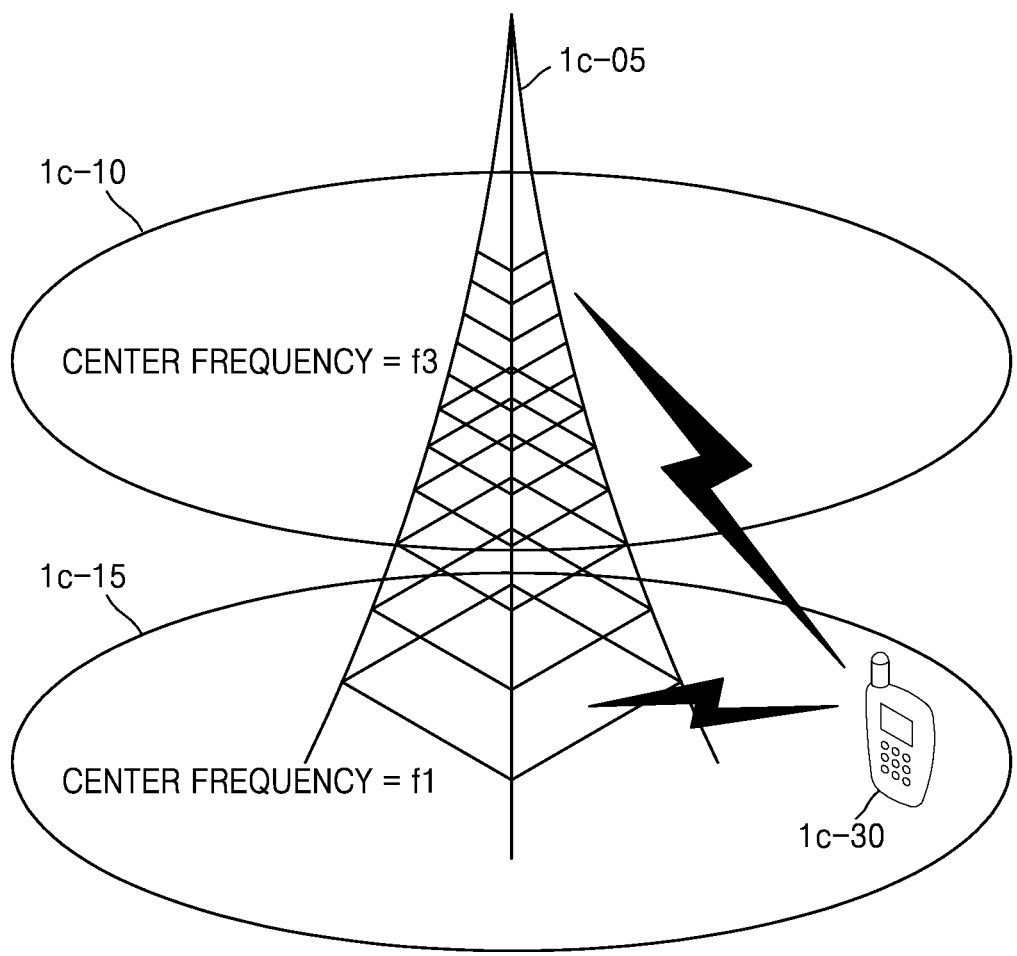
FIG. 1C is a diagram for explaining a carrier aggregation technology for a terminal.

FIG. 1C is a diagram for explaining a CA technology for a UE.

Referring to FIG. 1C, in general, a base station may transmit and receive multiple carriers over several frequency bands. For example, when a base station 1c-05 transmits a carrier 1c-15 having a center frequency f1 and a carrier 1c-10 having a center frequency f3, a UE according to a related art transmits and receives data using one of the two carriers. However, a UE having a CA capability may simultaneously transmit and receive data on multiple carriers.

The base station 1c-05 may allocate, depending on the situation, more carriers to the UE 1c-30 having a CA capability, thereby increasing a transmission rate of the UE 1c-30.

In a traditional sense, when one forward carrier and one reverse carrier transmitted and received from a base station form a cell, CA may be understood as a UE simultaneously transmitting and receiving data via multiple cells. Through this, a maximum transmission rate increases in proportion to the number of aggregated carriers.

In the following description of the present disclosure, when a UE receives data on a forward carrier or transmits data on a reverse carrier, it has the same meaning as transmitting or receiving data by using a control channel and a data channel provided by a cell corresponding to a center frequency and a frequency band that characterize a carrier. In addition, although an embodiment of the present disclosure will be described based on an LTE system for convenience, the present disclosure may be applied to various wireless communication systems supporting CA.

Figure 1D:
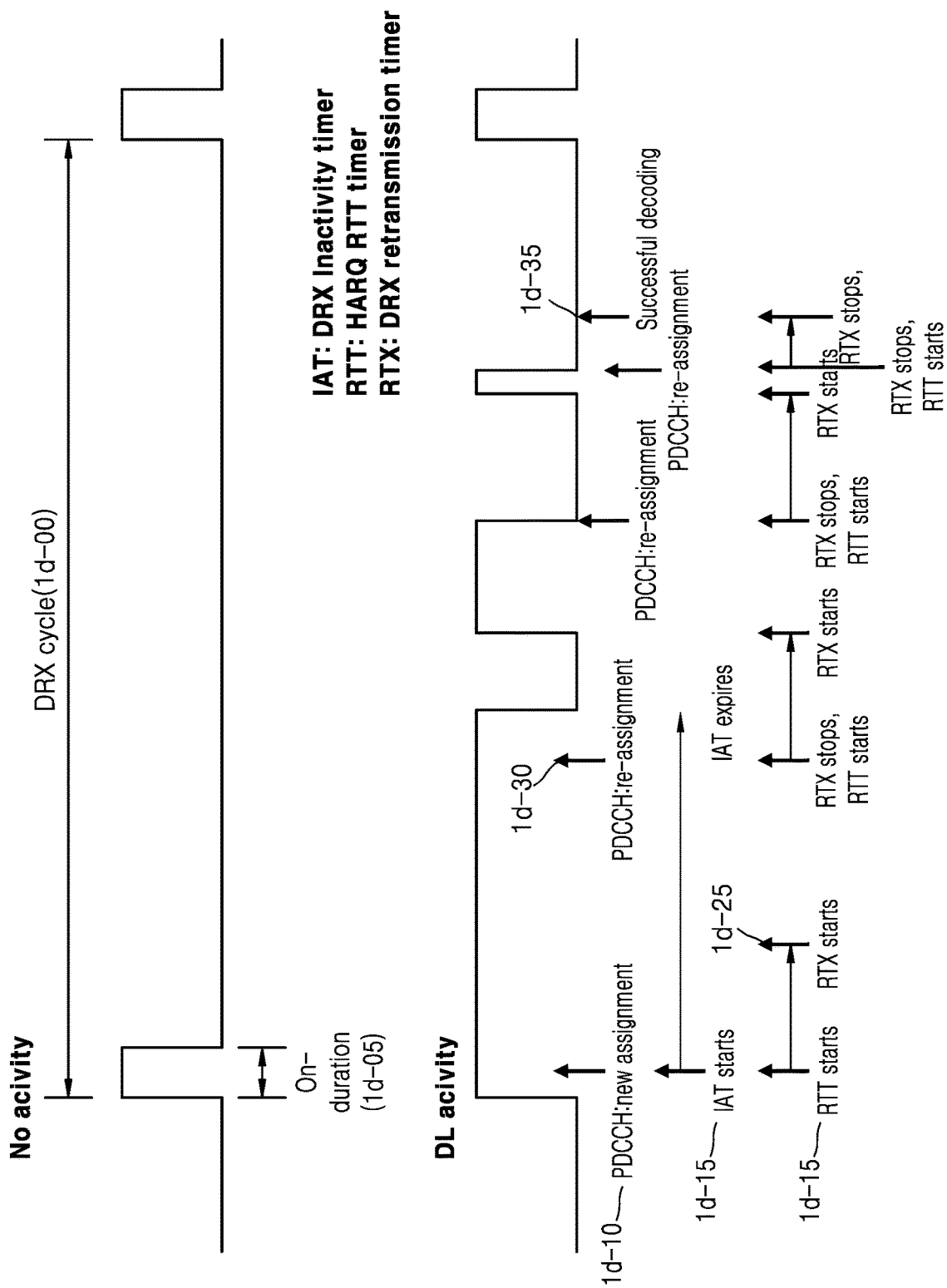
FIG. 1D is a diagram for describing a discontinuous reception (hereinafter, referred to as DRX) operation of a terminal.

FIG. 1D is a diagram for describing a discontinuous reception (hereinafter, referred to as DRX) operation of a UE.

DRX is a technology for monitoring, instead of all physical downlink control channels (hereinafter, referred to as PDCCHs), only some PDCCHs based on configuration information associated with configuration of a base station in order to obtain scheduling information for the purpose of minimizing power consumption of a UE. A basic DRX operation has a DRX cycle 1d-00 and is to monitor a PDCCH only during an on-duration period 1d-05. In a connected mode, two values of long DRX and short DRX may be configured for a DRX cycle. In a general case, a long DRX cycle is applied, and when necessary, the base station may additionally configure a short DRX cycle. When both the long DRX cycle and the short DRX cycle are configured, the UE repeats the short DRX cycle as soon as a drxShortCycleTimer starts, and when there is no new traffic until the drxShortCycleTimer expires, the UE may change the short DRX cycle to the long DRX cycle.

When scheduling information for a new packet is received on the PDCCH during the on-duration period 1d-05 (1d-10), the UE may start an InactivityTimer (1d-15). The UE may maintain an active state during the InactivityTimer. That is, the UE may continue to perform PDCCH monitoring.

Furthermore, the UE may start a HARQ Round Trip Time (RTT) timer (1d-20). The HARQ RTT timer is applied to prevent the UE from unnecessarily monitoring the PDCCH during HARQ RTT, and the UE does not need to perform PDCCH monitoring during an operation of the HARQ RTT timer. However, while the InactivityTimer and the HARQ RTT timer are running simultaneously, the UE may continue to perform PDCCH monitoring based on the InactivityTimer. When the HARQ RTT timer expires, a DRX retransmission timer starts (1d-25). While the DRX retransmission timer is running, the UE should perform PDCCH monitoring. In general, scheduling information for HARQ retransmission may be received during an operation of the DRX retransmission timer (1d-30). Upon receiving the scheduling information, the UE may immediately stop the DRX retransmission timer and restart the HARQ RTT timer. The above operation may continue until the packet is successfully received (1d-35).

Moreover, a medium access control (MAC) layer control message (MAC Control Element (MAC CE)) capable of controlling a DRX operation may exist in a MAC layer. When the base station no longer has data to transmit to the UE during the on-duration of the UE or while the InactivityTimer is running, the base station may transmit a DRX Command MAC CE message (including only a logical channel identifier (LCID)) to the UE. The UE that has received this may stop both the currently running on-duration timer and InactivityTimer, and use a short DRX cycle first when short DRX is configured or a long DRX cycle when only long DRX is configured.

In addition, the base station may transmit a Long DRX Command MAC CE to the UE, and the UE that has received this stops both the on-duration timer and the InactivityTimer, and when the short DRX is configured, stops even the drxShortCycleTimer such that a long DRX cycle may be immediately used.

When a length of the InactivityTimer is set to a value greater than 0 and the InactivityTimer expires, the UE may start (or restart) drxShortCycle Timer and use the short DRX cycle if short DRX is configured. When the length of the InactivityTimer is set to 0, the UE may immediately start (or restart) the drxShortCycleTimer and use the Short DRX cycle as soon as scheduling information for a new packet is received on the PDCCH.

Figure 1E:
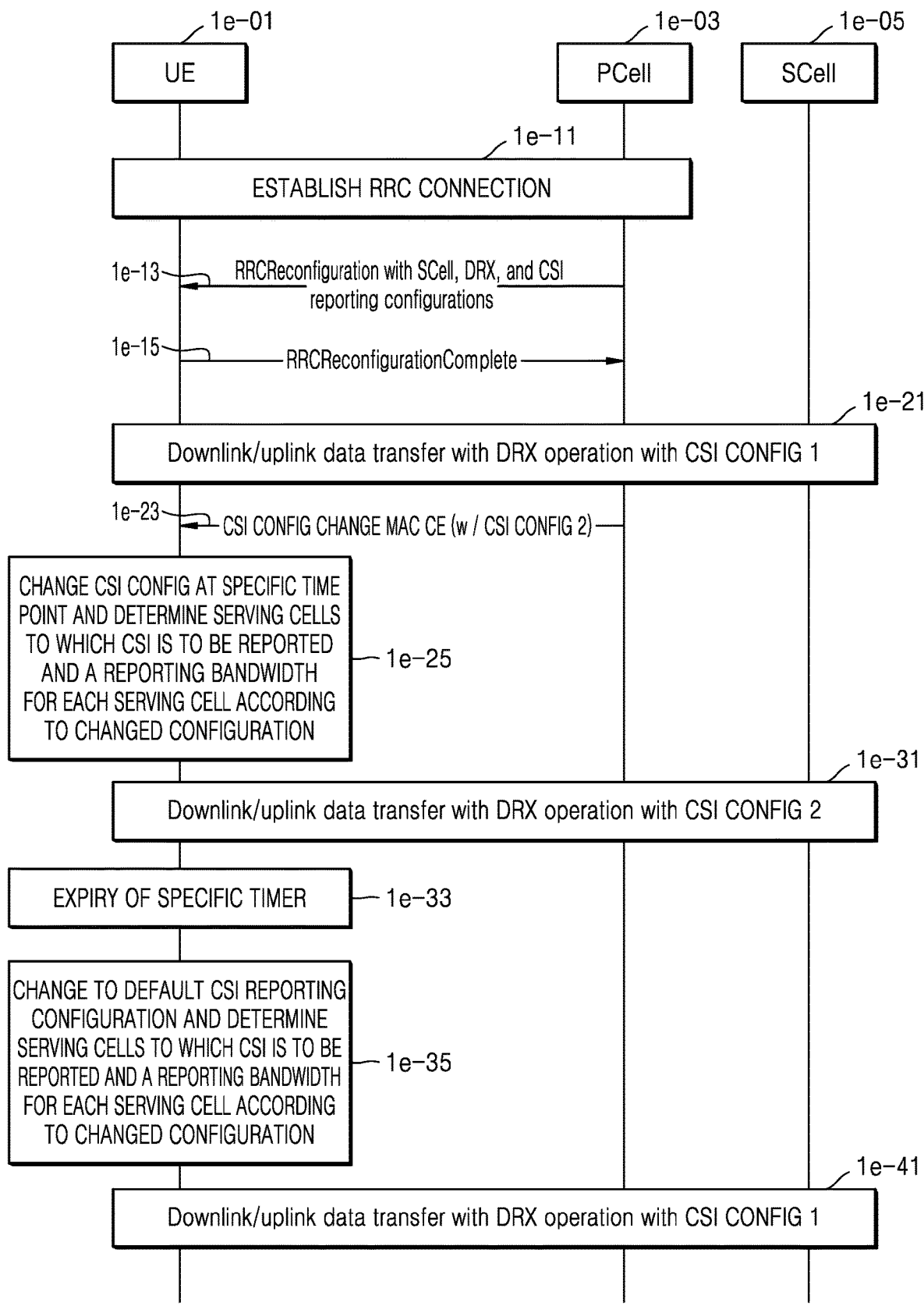
FIG. 1E is a diagram for describing a message flow between a base station and a terminal receiving a plurality of channel reporting configurations, according to an embodiment.

FIG. 1E is a diagram for describing a message flow between a base station and a UE that has received a plurality of channel reporting configurations, according to an embodiment.

Referring to FIG. 1E, a UE 1e-01 may perform access to a base station 1e-03 to establish a connection with the base station (1e-11). The above connection establishment procedure may include the UE performing random access to the base station, transmitting a connection request message (RRCSetupRequest) generated by an RRC layer, receiving a connection message (RRCSetup), and transmitting a confirmation message (RRCSetupComplete) therefor.

Thereafter, the base station may deliver various configurations to the UE 1e-01 according to capability of the UE, and information about the various configurations may be transmitted via an RRCReconfiguration message generated in an RRC layer (1e-13). The configurations may include various pieces of configuration information for adding/modifying/releasing a SCell 1e-05 and using the corresponding cell, and information related to a configuration of DRX and a configuration of lengths of various timers used in DRX (retransmissionTimer, drxStartOffset, long DRX cycle, short DRX cycle, drx-ShortCycleTimer, inactivityTimer, onDurationTimer), and for downlink data transmission on the PCell and the SCell, the configurations may include a measurement configuration related information about how to measure and report a certain downlink channel condition.

Moreover, the base station may configure the UE 1e-01 with a plurality of sets of measurement configuration related information (e.g., a measurement bandwidth, a location of reported uplink, a reporting period, etc.) and designate a configuration to be used as default configuration from among a plurality of configurations. For example, the base station may perform configurations according to the following scenarios.

Channel state information (CSI) reporting configuration 1 (default configuration): a configuration used when there is no data transmission/reception
  PCell: CSI measurement in the whole band (wideband) of PCell and reporting for a long period;
  SCell: No reporting.
CSI reporting configuration 2: a configuration used during active data transmission and reception
  PCell: CSI measurement for a specific bandwidth part (BWP) of PCell and reporting for a short period;
  SCell: Reporting with two configurations
    SCell set 1: CSI measurement for a specific BWP of SCell and reporting for period 1;
    SCell set 2: CSI measurement in the whole band (wideband) of SCell and reporting for period 2;

First active CSI reporting config ID: A reporting configuration identifier to be used immediately after this RRC configuration (e.g., 'CSI configuration 1' may be configured in this example.)

Accordingly, upon reception of RRC configuration values, the UE 1e-01 may transmit an RRCReconfiguration Complete message generated by the RRC layer to notify the base station that the corresponding RRC message has been properly received (1e-15). Then, the UE 1e-01 may perform a DRX operation in accordance with the received configuration information, and transmit or receive data to or from the base station while measuring and reporting a channel state to the base station according to a CSI reporting configuration indicated by the First active CSI reporting config ID (1e-21).

Thereafter, for reasons such as detecting an increase in the amount of data, the base station may transmit a CSI CONFIG CHANGE MAC CE to the UE (1e-23). A MAC CE is a control message generated in a MAC layer. CSI CONFIG CHANGE MAC CE is a MAC CE indicating which reporting configuration is to be used among a plurality of configured CSI reporting configurations, and the corresponding MAC CE may include a LCID indicating the CSI CONFIG CHANGE MAC CE and a reporting configuration identifier (indicating reporting configuration 2 in this exemplary drawing).

Accordingly, the base station quickly receives a more detailed channel state report, and indicate the UE to change to reporting configuration 2 so that data may be scheduled more efficiently and quickly. The UE may change a configuration to a reporting configuration indicated at a specific time point, and may determine serving cells to which CSI is to be reported and a reporting bandwidth for each serving cell according to the changed configuration (1e-25). When DRX is not configured, the specific time point may be a time point at which a MAC CE is received and HARQ ACK therefor is transmitted. The time point may be included in a PDCCH on which the MAC CE is scheduled. When DRX is configured, the time point may be a time point at which onDurationTimer starts. This is to prevent crosstalk between the UE and the base station by changing a reporting configuration at a fixed timing. Accordingly, the UE may perform data transmission and reception while reporting a channel state according to the indicated reporting configuration from the specific time point (1e-31).

Moreover, when the increased amount of data is all scheduled and no further data is available for scheduling, the base station may instruct the UE to use the originally used default reporting configuration.

As described above, as a method of instructing use of a default reporting configuration, a method of transmitting CSI CONFIG CHANGE MAC CE may be used.

Another method is, when DRX is configured for a UE, a method of changing to the default reporting configuration when a specific DRX timer expires. Examples of the specific DRX timer may include an inactivityTimer or a drxShortCycleTimer. This is because these timers expire when there is no data for transmission and reception.

Accordingly, when the timers expire in this scenario (1e-33), the UE may change a reporting configuration to a default reporting configuration (i.e., reporting configuration 1 in the above example), and may determine serving cells to which CSI is to be reported and a reporting bandwidth for each serving cell according to the changed default reporting configuration (1e-35). In addition, after expiry of the timer, the UE may perform data transmission/reception while reporting a channel state in accordance with the determined reporting configuration (the default reporting configuration or the reporting configuration indicated by the First active CSI reporting config ID) (1e-41).

Figure 1F:
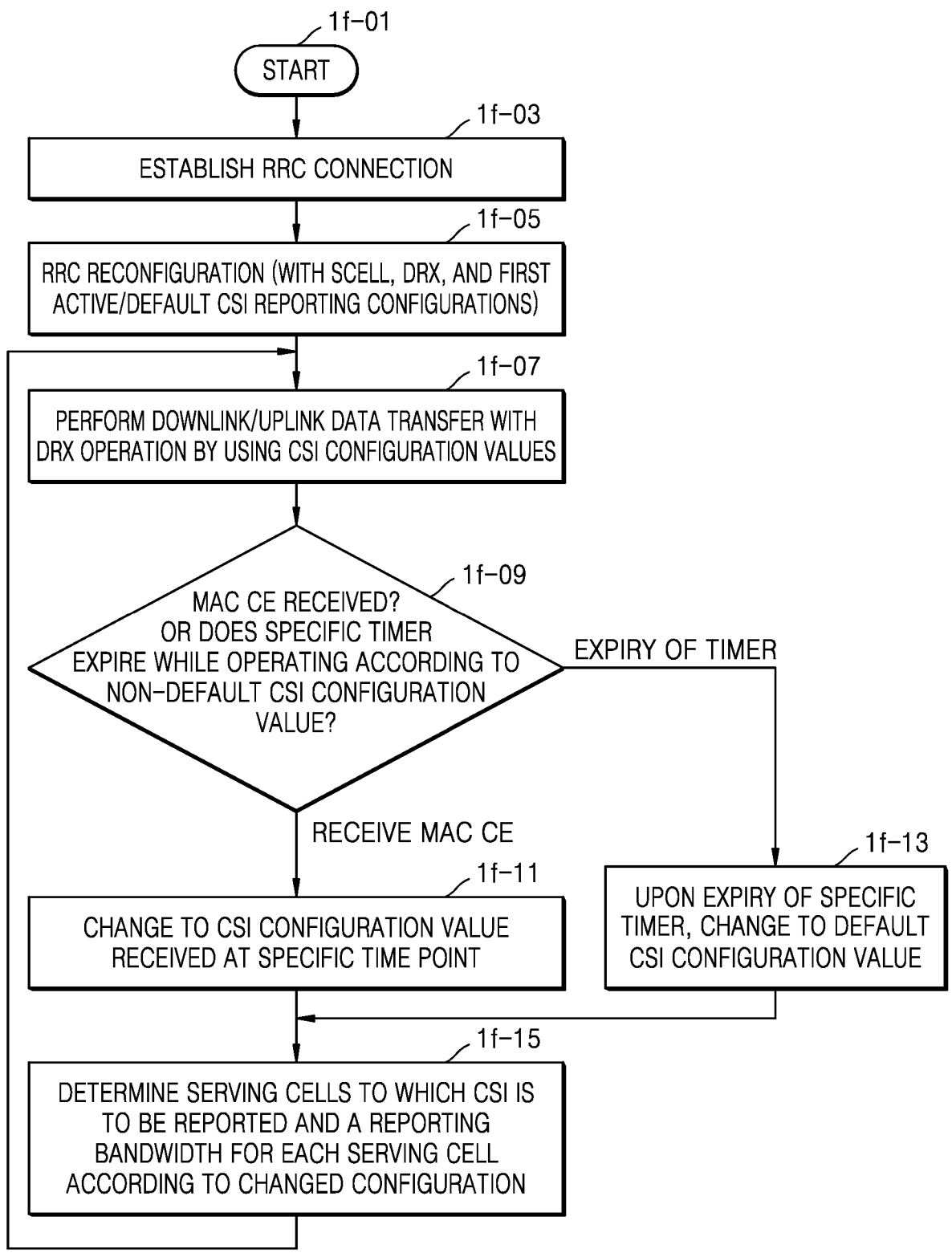
FIG. 1F is a flowchart for describing an operation of a terminal that has received a plurality of channel reporting configurations, according to an embodiment.

FIG. 1F is a flowchart for describing an operation of a UE that has received a plurality of channel reporting configurations, according to an embodiment.

It is assumed in FIG. 1F that the UE may perform access to the base station to establish a connection to the base station (1f-03). The connection establishment may include a procedure of the UE performing random access to the base station, transmitting a connection request message (RRCSetupRequest) generated by an RRC layer, receiving a connection message (RRCSetup), and transmitting a confirmation message (RRCSetupComplete) therefor.

Thereafter, the UE may receive various configurations from the base station by using an RRCReconfiguration message generated in the RRC layer (1f-05). The configurations may include various pieces of configuration information for adding/modifying/releasing the SCell and using the corresponding cell, and information related to a configuration of DRX and a configuration of lengths of various timers used in the DRX (retransmissionTimer, drxStartOffset, long DRX cycle, short DRX cycle, drx-ShortCycleTimer, inactivityTimer, onDurationTimer), and for downlink data transmission on the PCell and the SCell, the configurations may include measurement configuration related information about how to measure and report a certain downlink channel condition.

Moreover, the base station may configure the UE 1e-01 with a plurality of sets of measurement configuration related information (e.g., a measurement bandwidth, a location of reported uplink, a reporting period, etc.) and designate a configuration to be used as default configuration from among a plurality of configurations. For example, the base station may perform configurations according to the following scenarios.

CSI reporting configuration 1 (default configuration): a configuration used when there is no data transmission/reception
   PCell: CSI measurement in the whole band (wideband) of PCell and reporting for a long period;
   SCell: No reporting.
CSI reporting configuration 2: a configuration used during active data transmission and reception
   PCell: CSI measurement for a specific bandwidth part (BWP) of PCell and reporting for a short period;
   SCell: Reporting with two configurations.
   SCell set 1: CSI measurement for a specific BWP of SCell and reporting for period 1;
   SCell set 2: CSI measurement in the whole band (wideband) of S Cell and reporting for period 2;
First active CSI reporting config ID: A reporting configuration identifier to be used immediately after this RRC configuration (e.g., 'CSI configuration 1' may be configured in this example.)

Accordingly, upon reception of RRC configuration values, the UE may transmit an RRCReconfiguration Complete message generated by the RRC layer to notify the base station that the corresponding RRC message has been properly received.

Then, the UE may perform a DRX operation in accordance with the received configuration information, and transmit or receive data to or from the base station while measuring and reporting a channel state to the base station according to a CSI reporting configuration indicated by the First active CSI reporting config ID (1f-07).

Thereafter, the UE may receive a CSI CONFIG CHANGE MAC CE from the base station (1*f*-09). The UE that has received the corresponding MAC CE may change a configuration to a reporting configuration indicated at a specific time point (1*f*-11), and may determine serving cells to which CSI is to be reported and a reporting bandwidth for each serving cell according to the changed configuration (1*f*-15). When DRX is not configured, the specific time point may be a time point at which the MAC CE is received and HARQ ACK therefor is transmitted. The time point may be included in a PDCCH on which the MAC CE is scheduled. When DRX is configured, the time point may be a time point at which an onDurationTimer starts. This is to prevent crosstalk between the UE and the base station by changing a reporting configuration at a fixed timing. Accordingly, the UE may perform data transmission and reception while reporting a channel state according to the indicated reporting configuration from the specific time point (1*f*-07).

Furthermore, when the DRX is configured for the UE, a specific DRX timer may occasionally expire (1*f*-09). Examples of the specific DRX timer may include an InactivityTimer or a drxShortCycleTimer. This is because the timers expire when there is no data for transmission and reception. Accordingly, when the timers expire, the UE may change a reporting configuration to a default reporting configuration (default reporting configuration or the reporting configuration indicated by the First active CSI reporting config ID; and reporting configuration 1 in the above example) (1*f*-13), and may determine serving cells to which CSI is to be reported and a reporting bandwidth for each serving cell according to the changed default reporting configuration (1*f*-15). Thereafter, the UE may perform data transmission/reception while reporting a channel state in accordance with the default reporting configuration (1*f*-07).

Figure 2A:
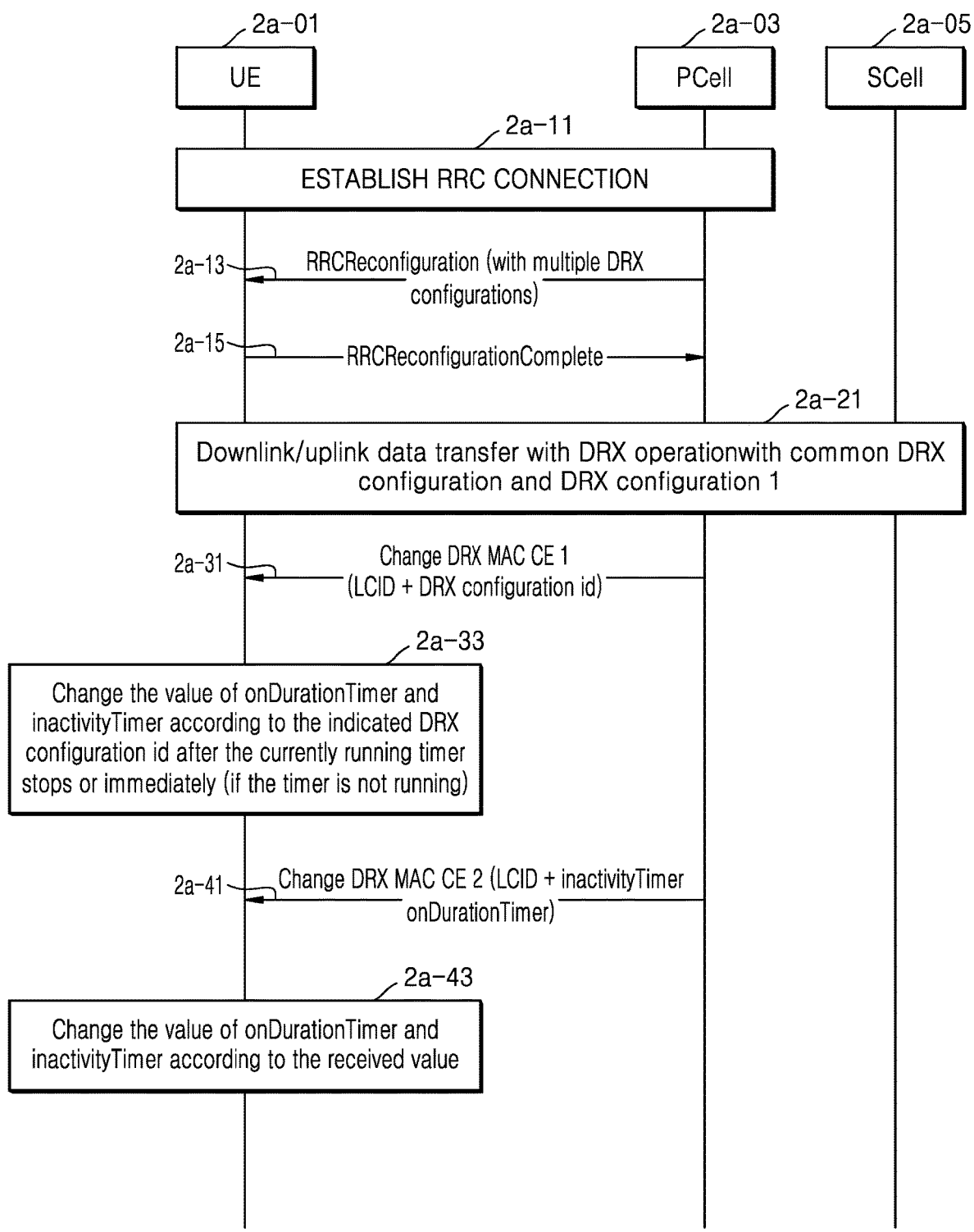
FIG. 2A is a diagram for describing a message flow between a base station and a terminal that has received a plurality of DRX configurations, according to an embodiment.

FIG. 2A is a diagram for describing a message flow between a base station and a UE that has received a plurality of DRX configurations, according to an embodiment.

Referring to FIG. 2A, a UE 2*a*-01 may perform access to a base station 2*a*-03 to establish a connection with the base station (2*a*-11). The connection establishment may include a procedure of the UE performing random access to the base station, transmitting a connection request message (RRCSetupRequest) generated by an RRC layer, receiving a connection message (RRCSetup), and transmitting a confirmation message (RRCSetupComplete) therefor.

Thereafter, the base station may deliver various configurations to the UE 1*e*-01 according to capability of the UE, and the various configurations may be transmitted via an RRCReconfiguration message generated in an RRC layer (2*a*-13). The configurations may include the DRX related configuration information. Lengths of the above-described DRX-related timers may be configured as the DRX related configuration information, and configurations may be performed as follows according to a type of timer.

common DRX configuration
    retransmissionTimer, drxStartOffset, long DRX cycle, short DRX cycle
  DRX configuration 1 (a configuration used when there is not much data transmission and reception)
    onDuration1, inactivityTimer1
  DRX configuration 2 (a configuration used during active data transmission and reception)
    onDuration2, inactivityTimer2
  Beginning DRX configuration id: A DRX configuration identifier to be used immediately after this RRC configuration (e.g., 'DRX configuration 1' may be configured.)

The reason for separately configuring DRX timers in this way is that the DRX-related timers included in the common DRX configuration are values that can be used fixedly regardless of data to be transmitted or received, whereas the DRX-related timers included in the DRX configuration 1 or 2 greatly help to reduce delay and power consumption when using different values depending on the amount of data to be transmitted or received. For example, when the UE and the base station each have a lot of data to transmit and receive, if onDuration timer and inactivityTimer having large lengths are used, Active Time may increase so that the UE and the base station may quickly transmit and receive data during the corresponding time and then move into a long DRX cycle.

On the other hand, when onDuration timer and inactivityTimer having small lengths are used despite a large amount of data, the UE may be in Active Time for a short time even though there is data, and thus, it will take a long time to transmit and receive all data and power consumption of the UE also increases.

Accordingly, upon reception of RRC configuration values, the UE may transmit an RRCReconfiguration Complete message generated by an RRC layer to notify the base station that the corresponding RRC message has been properly received (2*a*-15). Then, the UE may transmit and receive data while performing a DRX operation with a combination of the common DRX configuration and the DRX configuration value (i.e., DRX configuration 1) indicated by the Beginning DRX configuration id according the received configuration information (2*a*-21).

Thereafter, for reasons such as detecting an increase in the amount of data, the base station may transmit a Change DRX MAC CE (Type 1) to the UE (2*a*-31). The Change DRX MAC CE (Type 1) may include a LCID and the above-described DRX configuration identifiers, and accordingly, the base station may instruct the UE to change to a specific DRX configuration via the MAC CE. In FIG. 2A, a scenario is assumed in which changing a DRX configuration to DRX configuration 2 is indicated.

Accordingly, the UE that has received the MAC CE may change values of onDurationTimer and inactivityTimer according to the indicated DRX configuration (i.e., DRX configuration 2) after both the onDurationTimer and the inactivityTimer stop if they are currently running, or immediately if they are not running. When a newly configured value of inactivityTimer is 0, the UE may start (or restart) a drx-ShortCycleTimer immediately after the configuration (2*a*-33).

In another embodiment, the base station may transmit a Change DRX MAC CE (Type 2) to the UE (2*a*-41). The Change DRX MAC CE (Type 2) may be used to directly configure a LCID and values of InactivityTimer and onDurationTimer. Accordingly, the base station may adjust values of the onDuration timer and InactivityTimer of the UE by using, to the UE, the MAC CE instead of an RRC layer configuration message (i.e., an RRC Reconfiguration message) according to the situation.

The UE that has received the MAC CE may change values of the onDurationTimer and inactivityTimer according to the indicated DRX configuration (i.e., DRX configuration 2) after both the onDurationTimer and the inactivityTimer stop if they are currently running, or immediately if they are not running. When a newly configured value of inactivityTimer is 0, the UE may start (or restart) a drx-ShortCycleTimer immediately after the configuration (2*a*-43).

Thereafter, the UE may transmit and receive data while operating DRX according to the indicated value.

Figure 2B:
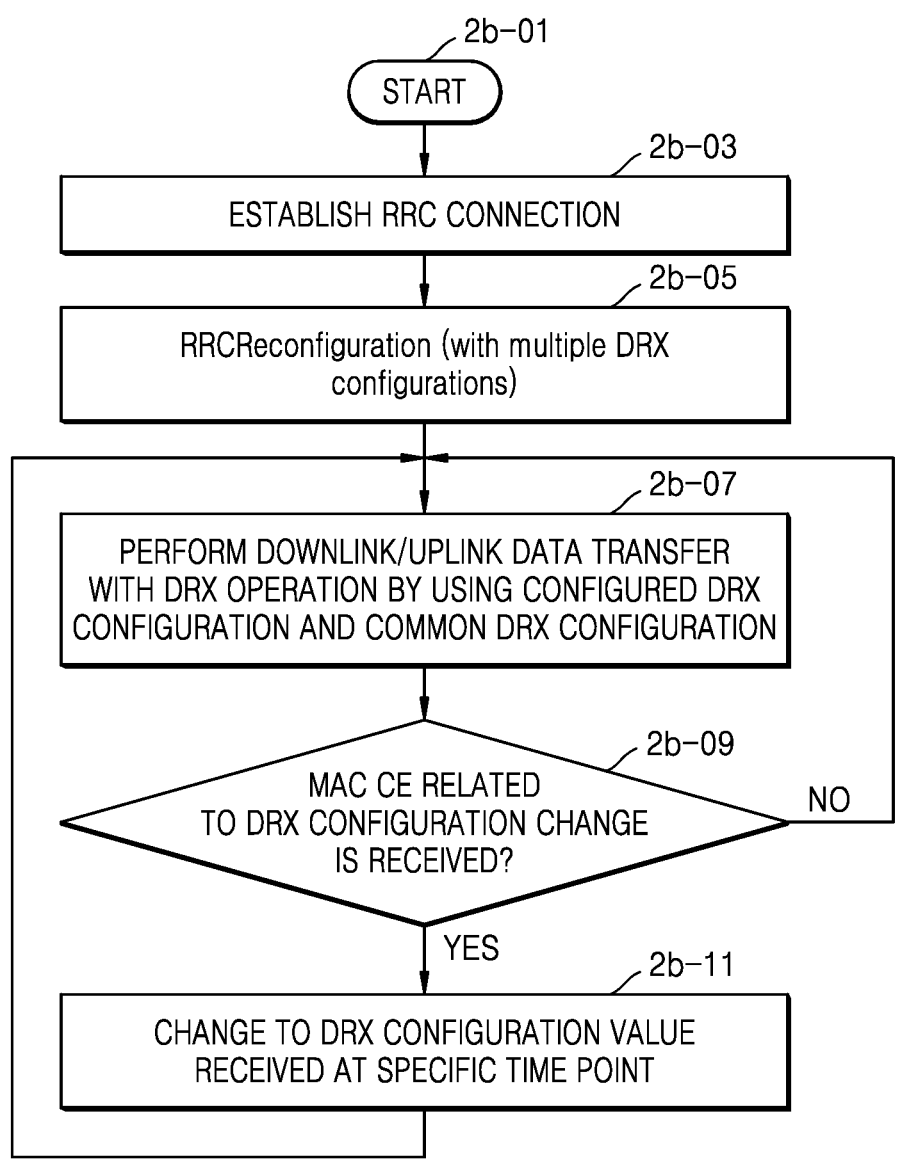
FIG. 2B is a flowchart for describing an operation of a terminal that has received a plurality of DRX configurations, according to an embodiment.

FIG. 2B is a flowchart for describing an operation of a terminal that has received a plurality of DRX configurations, according to an embodiment.

It is assumed in FIG. 2B that a UE may perform access to a base station to establish a connection with the base station (2b-03). The connection establishment may include a procedure of the UE performing random access to the base station, transmitting a connection request message (RRCSetupRequest) generated by an RRC layer, receiving a connection message (RRCSetup), and transmitting a confirmation message (RRCSetupComplete) therefor.

Thereafter, the UE may receive multiple configurations from the base station via an RRCReconfiguration message generated in an RRC layer (2b-03). The configurations may include DRX related configuration information. The DRX related configuration information may include configuration information related to lengths of the above-described DRX related timers, and configurations may be performed as follows according to a type of timer.

common DRX configuration
retransmissionTimer, drxStartOffset, long DRX cycle, short DRX cycle
DRX configuration 1 (a configuration used when there is not much data transmission and reception)
onDuration1, inactivityTimer1
DRX configuration 2 (a configuration used during active data transmission and reception)
onDuration2, inactivityTimer2
Beginning DRX configuration id: A DRX configuration identifier to be used immediately after this RRC configuration (e.g., 'DRX configuration 1' may be configured.)

The reason for separately configuring DRX timers in this way is that the DRX-related timers included in the common DRX configuration are values that can be used fixedly regardless of data to be transmitted or received, whereas the DRX-related timers included in the DRX configuration 1 or 2 may reduce delay and power consumption when using different values depending on the amount of data to be transmitted or received. For example, when the UE and the base station each have a lot of data to transmit and receive, if onDuration timer and inactivityTimer having large lengths are used, Active Time may increase so that the UE may quickly transmit and receive data during the corresponding time and then move into a long DRX cycle.

On the other hand, when onDuration timer and inactivityTimer having small lengths are used despite a large amount of data, the UE may be in Active Time for a short time even though there is data, and thus, it will take a long time to transmit and receive all data, and power consumption of the UE also increases.

Accordingly, upon reception of RRC configuration values, the UE may transmit an RRCReconfiguration Complete message generated by an RRC layer to notify the base station that the corresponding RRC message has been properly received. Then, the UE may transmit and receive data while performing a DRX operation with a combination of the common DRX configuration and a DRX configuration value indicated by the Beginning DRX configuration id according the received configuration information (2b-07).

Thereafter, the UE may receive a MAC CE related to a DRX configuration change from the base station (2b-09). Examples of the MAC CE related to a DRX configuration change may include a Change DRX MAC CE (Type 1) and a Change DRX MAC CE (Type 2).

The Change DRX MAC CE (Type 1) may include a LCID and the above-described DRX configuration identifiers, and accordingly, the base station may instruct the UE to change to a specific DRX configuration (e.g., DRX configuration 2) via the MAC CE.

The Change DRX MAC CE (Type 2) may directly include a LCID and values of InactivityTimer and onDurationTimer, and accordingly, the UE may be configured by the base station with InactivityTimer and onDurationTimer of a specific length according to the situation.

The UE that has received the MAC CE may change values of the onDurationTimer and inactivityTimer according to the received information after both the onDurationTimer and the inactivityTimer stop if they are currently running, or immediately if they are not running (2b-11). Furthermore, when a newly configured value of inactivityTimer is 0, the UE may start (or restart) a drx-ShortCycleTimer immediately after the configuration and enter a short DRX cycle.

Thereafter, the UE may transmit and receive data while operating DRX according to the indicated value (2b-07).

Figure 2C:
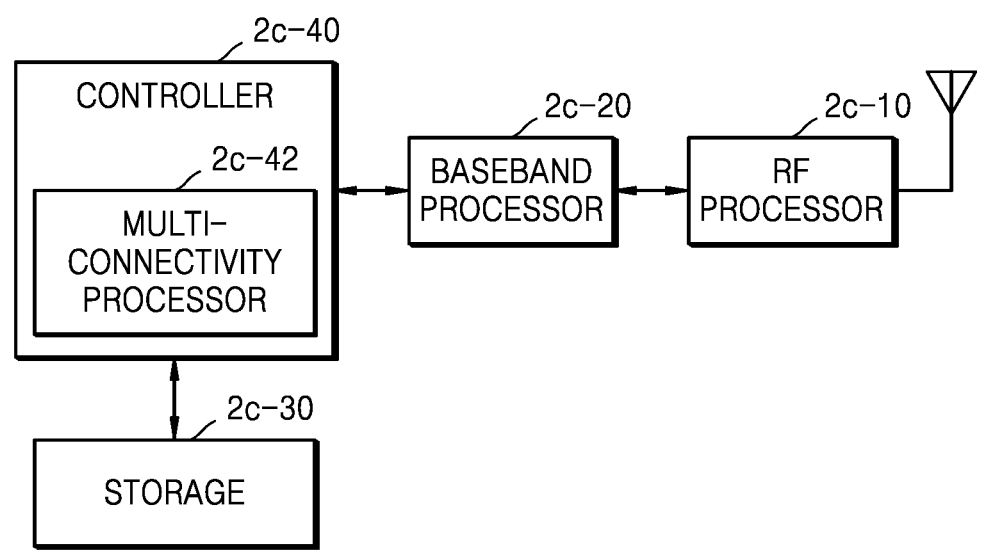
FIG. 2C is a block diagram of a terminal according to an embodiment of the present disclosure.

FIG. 2C is a block diagram of a UE according to an embodiment of the present disclosure.

Referring to FIG. 2C, the UE may include a radio frequency (RF) processor 2c-10, a baseband processor 2c-20, a storage 2c-30, and a controller 2c-40.

The RF processor 2c-10 may perform a function for transmitting and receiving a signal via a radio channel, such as signal conversion between bands and amplification. In detail, the RF processor 2c-10 may up-convert a baseband signal from the baseband processor 2c-20 into an RF signal and transmit the RF signal via an antenna. Furthermore, the RF processor 2c-10 may down-convert an RF signal received via the antenna into a baseband signal. For example, the RF processor 2c-10 may include a transmit filter, a receive filter, an amplifier, a mixer, an oscillator, a digital to analog convertor (DAC), an analog to digital convertor (ADC), etc.

Although only one antenna is shown in FIG. 2C, this is merely an embodiment, and the UE may include a plurality of antennas. The RF processor 2c-10 may also include multiple RF chains. Furthermore, the RF processor 2c-10 may perform beamforming. For beamforming, the RF processor 2c-10 may adjust a phase and a magnitude of each of the signals transmitted and received through multiple antennas or antenna elements.

The baseband processor 2c-20 may perform a function for conversion between a baseband signal and a bit string according to a physical layer standard of the system. For example, when transmitting data, the baseband processor 2c-20 may generate complex symbols by encoding and modulating a transmission bit string. Furthermore, when receiving data, the baseband processor 2c-20 may reconstruct a reception bit string by demodulating and decoding a baseband signal from the RF processor 2c-10. For example, according to an orthogonal frequency division multiplexing (OFDM) scheme, when transmitting data, the baseband processor 2c-20 may generate complex symbols by encoding and modulating a transmission bit string. Furthermore, the baseband processor 2c-20 may map the complex symbols to subcarriers and generate OFDM symbols through inverse fast Fourier transform (IFFT) operations and cyclic prefix (CP) insertion. Furthermore, when receiving data, the baseband processor 2c-20 may divide the baseband signal from the RF processor 2c-10 into OFDM symbols. The baseband processor 2c-20 may also recover signals mapped to subcarriers through FFT operations, and then reconstruct a reception bit string through demodulation and decoding.

The baseband processor 2c-20 and the RF processor 2c-10 may each transmit and receive signals as described above.

Thus, the baseband processor 2c-20 and the RF processor 2c-10 may be referred to as a transmitter, receiver, transceiver, or communicator. Furthermore, at least one of the baseband processor 2c-20 and the RF processor 2c-10 may include multiple communication modules to support multiple different radio access technologies. In addition, at least one of the baseband processor 2c-20 and the RF processor 2c-10 may include different communication modules to process signals in different frequency bands. For example, the different radio access technologies may include a wireless local area network (WLAN) technology (e.g., Institute of Electrical and Electronics Engineers (IEEE) 802.11), a cellular network technology (e.g., LTE), etc. The different frequency bands may include super-high frequency (SHF) bands (e.g., 2.5 GHz and 5 GHz) and millimeter (mm)-wave bands (e.g., 60 GHz).

The storage 2c-30 may store basic programs, application programs, and data such as configuration information for operations of the UE. In particular, the storage 2c-30 may store information related to a wireless LAN node performing wireless communication using a wireless LAN access technology. The storage 2c-30 may also provide stored data at the request of the controller 2c-40.

The controller 2c-40 may control all operations of the UE. For example, the controller 2c-40 may transmit and receive signals via the baseband processor 2c-20 and the RF processor 2c-10. The controller 2c-40 also writes and reads data to and from the storage 2c-40. To do so, the controller 2c-40 may include at least one processor. For example, the controller 2c-40 may include a communication processor (CP) for performing control for communication and an application processor (AP) for controlling upper layers such as application programs. According to an embodiment of the present disclosure, the controller 2c-40 may include a multi-connectivity processor 2c-42 that performs processing for operating in a multi-connectivity mode.

The controller 2c-40 may control the UE to perform a procedure as illustrated in the above-described operations of the UE. For example, the controller 2c-40 according to an embodiment of the present disclosure may change a reporting configuration according to a MAC CE received from a base station and expiry of a timer, thereby reducing consumption of power used to measure and report a channel state. As another example, the controller 2c-40 according to an embodiment of the present disclosure may collectively change a DRX configuration at a specific timing according to a MAC CE received from the base station, thereby reducing data transmission delay and power consumption of the UE.

Figure 2D:
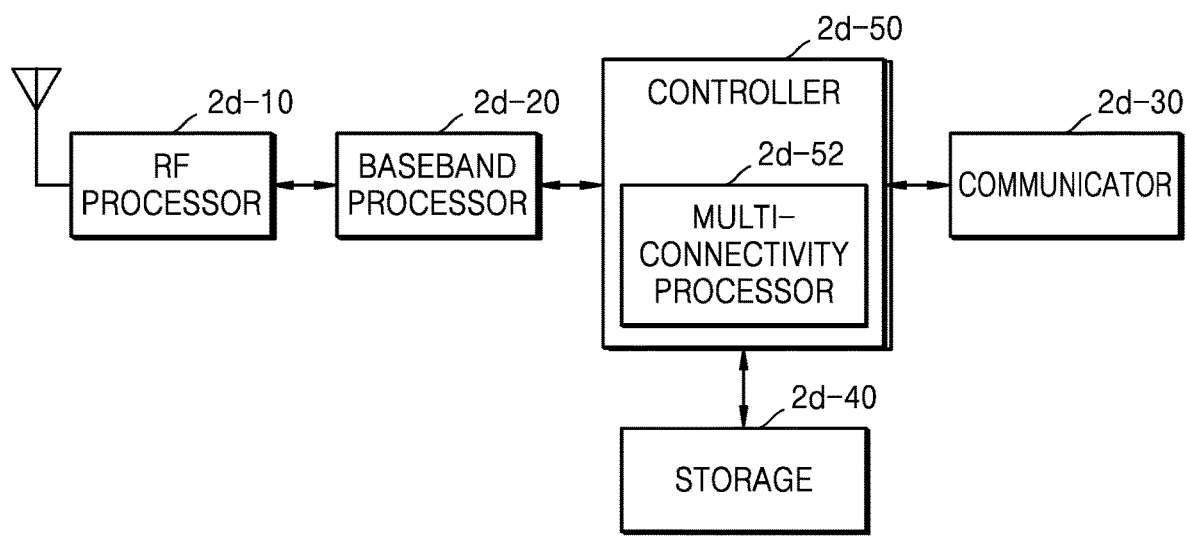
FIG. 2D is a block diagram of a base station according to an embodiment of the present disclosure.

FIG. 2D is a block diagram of a base station according to an embodiment of the present disclosure.

Referring to FIG. 2D, the base station may include an RF processor 2d-10, a baseband processor 2d-20, a backhaul communicator 2d-30, a storage 2d-40, and a controller 2d-50.

The RF processor 2d-10 performs a function for transmitting and receiving a signal via a radio channel, such as signal conversion between bands and amplification. In detail, the RF processor 2d-10 may up-convert a baseband signal from the baseband processor 2d-20 into an RF signal and transmit the RF signal via an antenna, The RF processor 2d-10 may also down-convert an RF signal received via the antenna into a baseband signal. For example, the RF processor 2d-10 may include a transmit filter, a receive filter, an amplifier, a mixer, an oscillator, a DAC, an ADC, etc. Although only one antenna is shown in FIG. 2D, the base station may have a plurality of antennas. Furthermore, the RF processor 2d-10 may include multiple RF chains. Furthermore, the RF processor 2d-10 may perform beamforming.

For beamforming, the RF processor 2d-10 may adjust a phase and magnitude of each of the signals transmitted and received through multiple antennas or antenna elements. Furthermore, the RF processor 2d-10 may perform a multiple-input multiple-output (MIMO) downlink operation by transmitting one or more layers.

The baseband processor 2d-20 may perform a function for conversion between a baseband signal and a bit string according to a physical layer standard of a radio access technology. For example, when transmitting data, the baseband processor 2d-20 may generate complex symbols by encoding and modulating a transmission bit string. Furthermore, when receiving data, the baseband processor 2d-20 may reconstruct a reception bit string by demodulating and decoding a baseband signal from the RF processor 2d-10. For example, according to an OFDM scheme, when transmitting data, the baseband processor 2d-20 may generate complex symbols by encoding and modulating a transmission bit string, map the complex symbols to subcarriers, and generate OFDM symbols through IFFT operations and CP insertion.

Furthermore, when receiving data, the baseband processor 2d-20 may divide the baseband signal from the RF processor 2d-10 into OFDM symbols. The baseband processor 2d-20 may recover signals mapped to subcarriers through FFT operations, and reconstruct a reception bit string through demodulation and decoding. The baseband processor 2d-20 and the RF processor 2d-10 transmit and receive signals as described above.

Thus, the baseband processor 2d-20 and the RF processor 2d-10 may be referred to as a transmitter, receiver, transceiver, communicator, or wireless communicator.

The storage 2d-40 may store basic programs, application programs, and data such as configuration information for operations of the base station. The storage 2d-40 may also provide stored data at the request of the controller 2d-50.

The controller 2c-50 may control the UE to perform a procedure as illustrated in the above-described operations of the UE. For example, the controller 2d-50 may transmit and receive signals through the baseband processor 2d-20 and the RF processor 2d-10 or through the backhaul communicator 2d-30. Furthermore, the controller 2d-50 writes and reads data to and from the storage 2d-40. To do so, the controller 2d-50 may include at least one processor.

Methods according to embodiments of the present disclosure described in the appended claims or specification thereof may be implemented in hardware, software, or a combination of hardware and software.

When the methods are implemented in software, a computer-readable storage medium having at least one program (software module) stored therein may be provided. The at least one program stored in the computer-readable storage medium is configured for execution by at least one processor within an electronic device. The at least one program includes instructions that cause the electronic device to execute the methods according to the embodiments of the present disclosure described in the claims or specification thereof.

The program (software module or software) may be stored in random access memory (RAM), non-volatile memory including a flash memory, read-only memory (ROM), electrically erasable programmable ROM (EEPROM), magnetic disc storage devices, compact disc (CD)-ROM, digital versatile discs (DVDs) or other types of optical storage devices, and magnetic cassettes. Alternatively, the program may be stored in a memory that is configured as a combination of some or all of the stated devices. A plurality of such memories may be included to store the program.

Furthermore, the program may be stored in an attachable storage device that may be accessed through communication networks such as the Internet, Intranet, a local area network (LAN), a wide LAN (WLAN), and a storage area network (SAN) or a communication network configured in a combination thereof. The storage device may connect to a device for performing the methods according to the embodiments of the present disclosure via an external port. Further, a separate storage device on the communication network may also connect to a device for performing the methods according to the embodiments of the present disclosure.

In the specific embodiments of the present disclosure, a component included in the present disclosure is expressed in a singular or plural form depending on the presented specific embodiments. However, singular or plural expressions are selected to be suitable for the presented situations for convenience, and the present disclosure is not limited to elements in a singular or plural form, i.e., an element expressed in a plural form may be configured as a single element, or an element expressed in a singular form may be configured as a plurality of elements.

Moreover, although specific embodiments have been described in the detailed description of the present disclosure, various modifications may be made therein without departing from the scope of the present disclosure. Thus, the scope of the present disclosure should not be limited to the described embodiments but be defined by the following claims as well as their equivalents.

The invention claimed is:

1. A method performed by a user equipment (UE) in a wireless communication system, the method comprising:
   receiving, from a base station, discontinuous reception (DRX) configuration information, wherein the DRX configuration information includes configuration information respectively corresponding to at least one DRX mode, a DRX configuration identifier corresponding to a beginning DRX mode, and common DRX configuration information, and wherein the configuration information respectively corresponding to the at least one DRX mode includes at least one information about on duration timer, or information about inactivity timer;
   identifying a duration timer of a first DRX mode and an inactivity timer of the first DRX mode, based on the configuration information and the DRX configuration identifier;
   performing the first DRX mode, based on the configuration information for the first DRX mode and the common DRX configuration information;
   receiving, from the base station, a medium access control-control element (MAC-CE) including a DRX configuration identifier corresponding to a second DRX mode and logical channel identifier, LCID; and
   starting a duration timer of the second DRX mode and an inactivity timer of the second DRX mode, based on the MAC-CE, the duration timer of the first DRX mode and the inactivity timer of the first DRX mode.

2. The method of claim 1, further comprising:
   receiving, from the BS, another MAC-CE including the LCID, information about length of on-duration timer and information about inactivity timer.

3. The method of claim 1, further comprising:
   based on reception of the MAC-CE, stopping a DRX timer corresponding to the first DRX mode.

4. A method performed by a base station in a wireless communication system, the method comprising:
   transmitting, to a user equipment (UE), discontinuous reception (DRX) configuration information, wherein the DRX configuration information includes configuration information respectively corresponding to at least one DRX mode, a DRX configuration identifier corresponding to a beginning DRX mode, and common DRX configuration information, and wherein the configuration information respectively corresponding to the at least one DRX mode includes at least one information about on duration timer, or information about inactivity timer, and wherein a first DRX mode is performed at the UE based on the configuration information for the first DRX mode and the common DRX configuration information; and
   transmitting, to the UE, a medium access control-control element (MAC-CE) including a DRX configuration identifier corresponding to a second DRX mode and logical channel identifier (LCID),
   wherein a duration timer of the second DRX mode and an inactivity timer of the second DRX mode are performed at the UE, based on the MAC-CE, a duration timer of the first DRX mode and an inactivity timer of the first DRX mode, and
   wherein the duration timer of the first DRX mode and the inactivity timer of the first DRX mode are identified, based on the configuration information and the DRX configuration identifier.

5. The method of claim 4, further comprising:
   transmitting, to the UE, another MAC-CE including the LCID, information about length of on-duration timer and information about inactivity timer.

6. A user equipment (UE) in a wireless communication system, the UE comprising:
   a transceiver; and
   at least one processor configured to:
      receive, via the transceiver, from a base station, discontinuous reception (DRX) configuration information, wherein the DRX configuration information includes configuration information respectively corresponding to at least one DRX mode, a DRX configuration identifier corresponding to a beginning DRX mode, and common DRX configuration information, and wherein the configuration information respectively corresponding to the at least one DRX mode includes at least one information about on duration timer, or information about inactivity timer,
      identify a duration timer of a first DRX mode and an inactivity timer of the first DRX mode, based on the configuration information and the DRX configuration identifier,
      perform the first DRX mode, based on the configuration information for the first DRX mode and the common DRX configuration information,
      receive, via the transceiver, from the base station, a medium access control-control element (MAC-CE) including a DRX configuration identifier corresponding to a second DRX mode and logical channel identifier, LCID, and
      start a duration timer of the second DRX mode and an inactivity timer of the second DRX mode, based on the MAC-CE, the duration timer of the first DRX mode and the inactivity timer of the first DRX mode.

7. The UE of claim 6, wherein the at least one processor is further configured to:
 receive, via the transceiver, from the BS, another MAC-CE including the LCID, information about length of on-duration timer and information about inactivity timer.

8. The UE of claim 6, wherein the at least one processor is configured to:
 based on reception of the MAC-CE, stop a DRX timer corresponding to the first DRX mode.

9. A base station in a wireless communication system, the base station comprising:
 a transceiver; and
 at least one processor configured to:
  transmit, via the transceiver, to a user equipment (UE) DRX configuration information, wherein the DRX configuration information includes configuration information respectively corresponding to at least one DRX mode, a DRX configuration identifier corresponding to a beginning DRX mode, and common DRX configuration information, and wherein the configuration information respectively corresponding to the at least one DRX mode includes at least one information about on duration timer, or information about inactivity timer, and wherein a first DRX mode is performed at the UE based on the configuration information for the first DRX mode and the common DRX configuration information, and
  transmit, via the transceiver, to the UE, a medium access control-control element (MAC-CE) including a DRX configuration identifier corresponding to a second DRX mode and logical channel identifier, LCID,
 wherein a duration timer of the second DRX mode and an inactivity timer of the second DRX mode are started at the UE, based on the MAC-CE, a duration timer of the first DRX mode and an inactivity timer of the first DRX mode, and
 wherein the duration timer of the first DRX mode and the inactivity timer of the first DRX mode are identified, based on the configuration information and the DRX configuration identifier.

10. The base station of claim 9, wherein the at least one processor configured to:
 transmit, via the transceiver, to the UE, another MAC-CE including the LCID, information about length of on-duration timer and information about inactivity timer.

11. The base station of claim 9, wherein based on reception of the MAC-CE, a DRX timer corresponding to the first DRX mode is stopped.

* * * * *